United States Patent [19]

Bricker et al.

[11] Patent Number: 5,502,089
[45] Date of Patent: Mar. 26, 1996

[54] POLYMER EMULSION AGENT FOR CROSS-LINKING A POLYMER EMULSION AND METHOD FOR MAKING A POLYMER FILM

[75] Inventors: Mark C. Bricker, Gilbertsville; Paul R. Van Rheenen, Warminster, both of Pa.

[73] Assignee: Rohm and Haas Company, Philadelphia, Pa.

[21] Appl. No.: 303,274

[22] Filed: Sep. 7, 1994

Related U.S. Application Data

[63] Continuation of Ser. No. 110,523, Aug. 20, 1993, abandoned.

[51] Int. Cl.$^6$ ........................................... C08L 1/26
[52] U.S. Cl. ................ 524/44; 524/155; 524/186; 524/243; 524/284; 524/300; 524/317; 524/366; 524/375; 524/376; 524/378; 524/503; 524/505; 524/516; 524/556
[58] Field of Search ...................... 524/176, 394, 524/396, 398, 423, 429, 435, 503, 556, 745, 785, 155, 186, 243, 284, 44, 300, 317, 366, 375, 376, 378, 505, 516

[56] References Cited

U.S. PATENT DOCUMENTS

| 2,227,163 | 12/1940 | Starck et al. | 524/459 |
|---|---|---|---|
| 3,365,408 | 1/1968 | Ohara | 524/435 X |
| 3,740,366 | 6/1973 | Sanderson et al. | 524/556 |
| 4,018,286 | 4/1977 | Gall et al. | 166/295 |
| 4,118,357 | 10/1978 | Brabetz et al. | 260/29.6 WA |
| 4,177,180 | 12/1979 | Hall | 524/435 X |
| 4,347,172 | 8/1982 | Nishida et al. | 524/435 X |
| 4,421,660 | 12/1983 | Sok nee Jujna | 524/435 X |
| 4,751,108 | 6/1988 | Larimore et al. | 427/171 |
| 4,818,783 | 4/1989 | Shioji et al. | 524/503 X |
| 5,296,532 | 3/1994 | Haerzschel et al. | 524/503 X |

FOREIGN PATENT DOCUMENTS 63-86778   4/1988   Japan .

OTHER PUBLICATIONS

Gelvatol, Polyvinyl Alcohol Resin, Technical Bulletin 6082G, Properties and Use, Monsanto.

*Primary Examiner*—Judy M. Reddick
*Attorney, Agent, or Firm*—Joseph F. Leightner

[57] ABSTRACT

A crosslinkable polymeric emulsion has a pH from about 1.5 to about 8.5 and includes a carboxyl-substituted latex polymer dispersed in an aqueous medium, an Iron (III) compound and an amount of a stabilizer, selected from the group consisting of nonionic surfactants and protective colloids, effective to sterically stabilize the emulsion. A method for making a crosslinked polymer film includes forming a layer of the crosslinkable polymer emulsion and drying the layer to form the crosslinked polymer film wherein the film is ionically crosslinked between carboxyl substituent groups of the polymer by Iron (III) cations. A crosslinking agent for carboxyl-substituted polymers includes particles of a water-insoluble Iron (III) compound having an average maximum characteristic linear dimension of less than or equal to about 5 microns.

18 Claims, No Drawings

5,502,089

POLYMER EMULSION AGENT FOR CROSS-LINKING A POLYMER EMULSION AND METHOD FOR MAKING A POLYMER FILM

This application is a continuation of application Ser. No. 110,523, filed Aug. 20, 1993, now abandoned.

TECHNICAL FIELD

The present invention relates to polymer emulsions, more particularly to aqueous emulsions of carboxyl-substituted polymers that may be crosslinked using polyvalent metal compounds, and to films formed therefrom.

BACKGROUND

U.S. Pat. No. 3,740,366 discloses pressure sensitive adhesives prepared from an aqueous dispersion or solution of a polymer that includes free carboxylic groups and a compatible polyvalent metal compound. The polyvalent metal compound may be a ionic compound, an organo-metallic complex or a metal chelate that is at least partially ionizable or soluble in the dispersing medium or solvent. Use of zinc and zirconium compounds as suitable polyvalent metal compounds is demonstrated in the Examples of the '366 patent. The adhesive compositions of the '366 patent exhibit improved shear resistance while maintaining good tackiness.

Despite the useful properties of the zinc and zirconium crosslinked emulsions taught in the '366 patent, such compounds are not effective in crosslinking polymer emulsions that have a pH in the acid to neutral range. Furthermore, the use of zinc and other heavy metals has become undesirable from an environmental perspective.

There is a need in the art for an inexpensive, effective, one pot, low toxicity crosslinker that can be used over a wide range of pH to cross link carboxyl-substituted latex polymer emulsions through reaction with the carboxyl substituent groups of the polymer.

SUMMARY OF THE INVENTION

A crosslinkable polymeric emulsion is disclosed. The emulsion has a pH from about 1.5 to about 8.5 and includes a carboxyl-substituted latex polymer dispersed in an aqueous medium, an Iron (III) compound and an effective amount of a steric stabilizer.

A method for making a crosslinked polymer film is disclosed. The method includes forming a layer of the above-described crosslinkable polymer emulsion and drying the layer to form the crosslinked polymer film wherein the film is crosslinked between carboxyl substituent groups of the polymer by polyvalent iron cations.

A crosslinking agent for carboxyl-substituted polymers is disclosed. The crosslinking agent includes particles of a water-insoluble Iron (III) compound having an average maximum characteristic linear dimension of less than or equal to about 5 microns.

An alternative embodiment is disclosed wherein a polymeric emulsion having a pH from about 1.5 to about 8.5 includes a latex polymer dispersed in an aqueous medium, an Iron (III) compound and an amount of poly(vinyl alcohol) effective to sterically stabilize the emulsion.

DETAILED DESCRIPTION OF THE INVENTION

The carboxyl-substituted latex polymer of the crosslinkable emulsion of the present invention is a copolymer of an ethylenically unsaturated carboxylic acid monomer and an ethylenically unsaturated comonomer.

Suitable ethylenically unsaturated carboxylic acid monomers include, for example, acrylic acid, methacrylic acid, crotonoic acid, itaconic acid, aconitic acid, atropic acid, maleic acid, fumaric acid, vinyl acetic acid, vinyl benzoic acid and mixtures thereof.

It is believed that other functional groups that form water insoluble iron compounds, for example, phosphonate or sulfonate groups, can be used in addition to or in place of carboxyl groups to provide crosslinking sites on the polymer backbone. Monomeric units including such groups can be derived from ethylenically unsaturated functional monomers, for example, phosphoethyl methacrylate, sulfoethyl methacrylate.

Suitable ethylenically unsaturated monomers include monoethylenically unsaturated, that is, having a single ethylenically unsaturated site per molecule, monomers, for example, ethylene, butadiene, methyl methacrylate, ethyl acrylate, butyl acrylate, butyl methacrylate, isodecyl acrylate, 2-ethyl hexyl acrylate, hydroxyethyl methacrylate, hydroxypropyl methacrylate, acrylamide, methacrylamide, acrylonitrile, vinyl acetate, vinyl propionate, vinyl versatare, vinyl toluene, styrene and mixtures thereof.

In addition to the ionic crosslinking introduced by the Iron (III) compound of the present invention, the carboxyl-substituted latex polymer may, optionally, also be covalently crosslinked. If such covalent crosslinking is desired, the ethylenically unsaturated comonomer further includes a small amount, for example, from about 0.01 weight percent (wt %) to about 5 wt % based on the weight of copolymer, of a polyethylenically unsaturated, that is, having two or more ethylenically unsaturated sites per molecule, monomer. Suitable polyethylenically unsaturated monomers include, for example, allyl methacrylate, diallyl phthalate, divinyl benzene and mixtures thereof.

In a preferred embodiment, the ethylenically unsaturated comonomer includes a monomer selected from the group consisting of methyl methacrylate, butyl acrylate, ethyl acrylate, ethyl hexyl acrylate, styrene, vinyl acetate, acrylonitrile and mixtures thereof.

In a preferred embodiment, the carboxyl-substituted latex polymer includes from about 1 wt % to about 7 wt % monomeric units derived from the ethylenically unsaturated carboxylic acid monomer and about 93 wt % to about 99 wt % monomeric units derived from the ethylenically unsaturated comonomer.

In another preferred embodiment, the polymer includes from about 2 wt % to about 5 wt % monomeric traits derived from the ethylenically unsaturated carboxylic acid monomer and about 95 wt % to about 97 wt % monomeric units derived from the ethylenically unsaturated comonomer.

In general, it is preferred that the weight average molecular weight of the polymer falls within a range about 500,000 to about 4,000,000.

In general, it is preferred that the latex polymer has a weight average particle size from about 200 nanometers (nm) to about 1,000 nm.

The latex polymer can be made by various conventional addition polymerization techniques for polymerizing ethylenically unsaturated monomers. Such techniques are well known in the art.

In a preferred embodiment, the polymer is made by free radical initiated emulsion polymerization of a mixture of the ethylenically unsaturated carboxylic acid monomer and an ethylenically unsaturated comonomer. The emulsion may be stabilized by use of a colloidal stabilizer, an anionic surfactant stabilizer, a nonionic surfactant stabilizer or a mixture thereof.

In a preferred embodiment, the emulsion includes from about 30 wt % to about 65 wt % carboxyl-substituted latex polymer. In a more highly preferred embodiment, the emulsion includes from about 40 wt % to about 60 wt % carboxyl-substituted latex polymer.

The crosslinkable emulsion of the present invention includes an amount of a steric stabilizer effective to sterically stabilize the emulsion. As used herein, the terminology "steric stabilizer" refers to compounds which are adsorbed to the polymer particles of the emulsion and form hydrophilic protective layers around the respective particles to prevent agglomeration of the particles. Suitable steric stabilizers include, for example, protective colloids and nonionic surfactants having a hydrophilic/lipophilic balance (HLB) greater than about 10.

Suitable protective colloids include chemically grafted or strongly absorbed protective colloids, for example, fully hydrolyzed poly(vinyl alcohol), partially hydrolyzed poly(vinyl alcohol), poly(vinyl pyrollidone), hydroxyethyl cellulose and mixtures thereof.

Suitable nonionic surfactants include those ethoxylated alkyl phenols, for example, octyl phenols and nonyl phenols modified with from about 5 to about 50 moles of ethylene oxide per molecule, ethoxylated alcohols, for example, ethoxylated (10 to 50 moles ethylene oxide per molecule) lauryl alcohol, ethoxylated (10 to 50 moles ethylene oxide per molecule) mercaptans, ethoxylated (10 to 50 moles ethylene oxide per molecule) fatty acids, ethoxylated (10 to 50 moles ethylene oxide per molecule) amines, ethoxylated (10 to 50 moles ethylene oxide per molecule) fatty esters, ethoxylated (10 to 50 moles ethylene oxide per molecule) oils, ethoxylated (10 to 50 moles ethylene oxide per molecule) sorbitan fatty acid esters, ethoxylated (10 to 50 moles ethylene oxide per molecule) sucrose esters and poly(ethylene oxide-propylene oxide) block copolymers having an HLB greater than about 10, as well as mixtures thereof.

In one embodiment, the steric stabilizer is added to a latex polymer that has been made in a conventional manner, for example, a commercially available carboxyl-substituted latex polymer such as, for example, RHOPLEX LC 40 or PRIMAL LC 45, each available from Rohm and Haas Company, Philadelphia, Pa., and is present in addition to any stabilizer used in the polymerization of the latex polymer.

Alternatively, at least a portion of the steric stabilizer is introduced to the polymerization reaction mixture to stabilize the latex polymer during formation of the latex polymer and any additional steric stabilizer is added during formulation of the crosslinkable emulsion of the present invention.

In a preferred embodiment, the emulsion includes from about 0.5 parts by weight (pbw) to about 5 pbw of the steric stabilizer per 100 pbw of the latex polymer. The amount of stabilizer required is proportional to the surface area of the latex polymer particles which is, in turn, directly related to the latex particle size.

The crosslinkable emulsion of the present invention includes a source of Iron (III) ions for forming ionic crosslinks between carboxylic acid groups of the polymer. As used herein the terminology "Iron (III)" means Iron atom in the +3 valence state and "Iron (III) compound" means an ionic compound, an organometallic complex or a metal chelate of Iron (III).

In a preferred embodiment, the emulsion includes from about 0.05 to about 1.5 equivalents Iron (III) ions per carboxyl substituent group of the carboxyl-substituted latex polymer, wherein each mole of the polyvalent iron ion is considered as being equivalent to x moles of carboxyl groups, with x being equal to the valence of the polyvalent iron ion, that is, one mole of Iron (III) ions is equivalent to three moles of carboxyl ions.

In a more highly preferred embodiment, the emulsion of the present includes from about 0.1 to about 1.0 equivalent Iron (III) ions per carboxyl substituent group of the carboxyl-substituted latex polymer.

A source of Iron (III) ions may be incorporated into the crosslinkable emulsion composition in any one of several ways.

Regardless of the manner in which iron ions are added to the emulsion, it is important that the pH of the crosslinkable emulsion is within a range from about 1.5 to about 8.5. In a preferred embodiment, the pH of the crosslinkable emulsion is from about 2 to about 7. In a particularly preferred embodiment, the pH of the emulsion is from about 3 to about 6. While not wishing to be bound by theory, it is believed that when the pH of the emulsion is below about 3, formation of iron crosslinks between carboxyl groups of the polymer is inhibited by displacement of ferric ions from the carboxyl groups by hydrogen ions. It is further believed that when the pH of the emulsion is above about 8, formation of iron crosslinks between carboxyl groups of the polymer is inhibited by the preferential reaction of ferric ions with hydroxyl ions.

In one embodiment of the present invention, finely divided iron powder is added to an emulsion in which an equivalent amount of an organic acid, for example, acetic acid, is present to thereby generate a soluble iron salt, for example, iron acetate, along with hydrogen gas, in situ.

In another embodiment of the present invention, finely divided iron powder is added to an emulsion containing a salt of an organic acid, for example, sodium acetate. The generation of ferric ions in such a composition can be inhibited by excluding oxygen from the system and subsequently encouraged by slow air drying of the composition.

In a preferred embodiment of the present invention, water soluble ferric salts, for example, ferric chloride, ferric nitrate, are directly added to the emulsion. Since the ferric salts are acidic, addition of the salts to a sterically stabilized latex polymer emulsion, in an amount effective to provide crosslinking, typically lowers the pH of the emulsion to about 2. The pH of the emulsion may then be upwardly adjusted, for example, to fall within the above-disclosed preferred ranges of pH, by the addition of a salt of a weak acid, for example, sodium acetate, sodium benzoate, potassium formate, sodium formate, potassium 2-ethyl hexanoate, sodium 2-ethyl hexanoate, sodium octoate. It should be noted that addition of strong base, for example, sodium hydroxide anmonia or an amine, to the composition after addition of the iron salt leads to flocculation of the emulsion and is, therefore, to be avoided.

The type of material used to adjust pH influences the effectiveness of the iron crosslinking because the neutralizing agents compete with the carboxyl groups of the polymer for the iron cations. Counterions that strongly coordinate iron, for example, citrate ions, lactate ions, can prevent crosslinking by dominating the competition and are, therefore, to be avoided.

Addition of an excess amount of a volatilizable counter ion, for example, potassium ethyl hexanoate, sodium octoate, allows iron crosslinking to be initially inhibited and subsequently encouraged by driving off the volatile material by air drying or baking the composition at an elevated temperature.

In a preferred embodiment, the Iron (III) compound is a water-insoluble organometallic compound, for example, ferric benzoate, ferric hexanoate, ferric 2-ethyl hexanoate, ferric octanoate, ferric naphthenoate, ferric oleate. The water-insoluble iron compound are preferred as crosslinkers in the emulsion of the present invention because such materials can be conveniently made and cleaned up prior to their introduction into the emulsion, to thereby avoid introduction of the byproducts, for example, NaCl, associated with generating an iron salt in situ or with adding an iron salt and a neutralizing base to the emulsion.

In a highly preferred embodiment, the water-insoluble Iron (III) compound is a colloidal dispersion of ferric benzoate. Even more preferably, the ferric benzoate particles of the colloidal dispersion have an average maximum characteristic linear dimension of less than or equal to about 5 microns, wherein the terminology "average maximum characteristic linear dimension" means the average length of the longest linear dimension characterizing the particles, for example, the average diameter of spherical particles, the average length of elongated particles. Particles within the preferred range of particle size tend to remain dispersed in the emulsion, whereas larger particles tend to gradually settle out of the emulsion. Compositions that include the larger size particles may therefore require remixing to redisperse the particles in the emulsion immediately prior to use.

Once added to the crosslinkable composition of the present invention, the colloidal organometallic particles do not appear to retain their original morphology, for example, while ferric benzoate particles are visible upon microscopic examination of a sample of a composition to which the particles have recently been added, those particles are no longer evident after a short, that is, 1 to 2 days, equilibration period. While not wishing to be bound by theory, it appears that the organometallic compound diffuses into the latex particles.

It should be noted that in crosslinkable emulsions stabilized by poly(vinyl alcohol), the addition of the Iron (III) compound provides the additional benefit of minimizing the large negative effect that the poly(vinyl alcohol) would otherwise have on the water resistance of dried films of such emulsions. The improved water resistance appears to be related to interaction between the Iron (III) compound and the poly(vinyl alcohol) and is exhibited by films formed from the crosslinkable emulsions of the present invention as well as films formed from analogous noncrosslinkable emulsions, that is, emulsions wherein the polymer lacks the above-described units derived from the carboxylic acid monomer. Suitable latex polymers for use in such noncrosslinkable emulsions include, for example, polymers consisting of 100 wt % of monomeric units derived from the above described ethylenically unsaturated comonomers.

The crosslinkable emulsions of the present invention are useful in adhesive and coating compositions, for example, creep resistant construction adhesives, high shear strength pressure sensitive adhesives, removable adhesives, coatings, caulks and mastics.

In general, adhesive and coating composition that include the crosslinkable emulsion of the present invention are applied to a substrate by conventional coating techniques, for example, roll coating, knife coating, curtain coating, and dried to form a crosslinked polymer film on the substrate.

In general, the crosslinkable emulsion of the present invention is used by applying a layer of the emulsion to a first substrate and then drying the layer to form a polymer layer on the substrate. In those applications wherein the polymer layer formed from the emulsion is to be used as a construction or laminating adhesive, the first substrate is subsequently applied to a second substrate to form a laminated article wherein the polymer layer is interposed between the first and second substrates to bond the substrates together.

The emulsion of the present invention is useful as a creep resistant adhesive for forming bonds between substrates that are to be subjected to static loads in such construction applications as panel, deck and floor joist bonding. Embodiments of the present invention that are particularly well suited for use as creep resistant adhesives are those wherein the latex polymer exhibits a glass transition temperature (Tg) from about −25° C. to about −5° C.

The emulsion of the present invention is useful as an adhesive film in high performance masking tapes and in removable labels, price tags and protective films due to the low peel build exhibited by such adhesive films, that is, the peel strength of such an adhesive film does not substantially increase over time. Embodiments of the present invention that are particularly well suited for use as pressure sensitive adhesives are those wherein the latex polymer exhibits a Tg from about −60° C. to about −25° C.

"High performance masking tapes" are those masking tapes used and removed under high temperature conditions, for example, to mask automobile windows and trim during painting. Such tapes must be cleanly removable from the substrate following a paint baking cycle while the substrate is still hot. A typical paint bake cycle involves subjecting the automobile to a temperature in the range of 250° F. to 350° F. for a time period from about 30 minutes to about 1 hour. High performance masking tapes according to the present invention comprise an adhesive layer derived from a crosslinkable emulsion of the present invention supported on a substrate, for example, a conventional masking tape crepe paper.

Removable price tags, labels and protective films of the present invention comprise an adhesive layer derived from a crosslinkable emulsion of the present invention supported on a substrate, for example, a conventional paper label stock or a polymeric film, and allow removal of the tag, label or film without leaving an adhesive residue on or tearing the surface of the packaging from which the tag, label or film is to be removed.

The emulsion of the present invention is useful as a coating layer on a wide range of substrates, including, for example, paper, metal, wood, polymers, ceramics. Embodiments of the present invention that are particularly well suited for use as coatings are those wherein the latex polymer exhibits a Tg from about 5° C. to about 50° C.

In each of the above described applications, the emulsion of the present invention may further include conventional additives, for example, tackifiers, fillers, pigments, thickeners, humectants, wetting agents, biocides, plasticizers, coalescents, antifoam agents and colorants.

Features of the present invention are illustrated below in Examples 1 to 44 and the improved performance provided by the emulsion of the present invention is highlighted by comparison with the performance of Comparative Examples C1 to C21.

EXAMPLE 1

An emulsion polymer of 23 wt % vinyl acetate, 75 wt % butyl acrylate and 2 wt % acrylic acid was prepared.

A stirred reactor containing 665 grams (g) deionized (DI) water was heated to 65° C. under nitrogen. Then 2 g of a 0.1 wt % aqueous solution of Iron (III) sulfate was added to the reactor, followed by a solution of 1.5 g aqueous 30% hydrogen peroxide in 10 g DI water.

Three reactant streams, that is:

i) a monomer mixture consisting of 648 g DI water, 300g of a 20% solution of partially hydrolyzed polyvinyl alcohol (Airvol-205, Air Products), 42.8 g of a 70 wt % solution of an octylphenol-10 mole ethoxylate surfactant (Triton X-100, Union Carbide) in water, 460 g of vinyl acetate, 1500 g butyl acrylate and 40 g acrylic acid;

ii) an initiator solution of 2.2 g of aqueous 30% hydrogen peroxide dissolved in 44.3 g DI water; and iii) a solution of 1.3 g of sodium sulfoxylate formaldehyde dissolved in 46.5 g DI water;

were then simultaneously fed to the reactor over a three hour period of time with stirring and while maintaining the temperature of the reactor contents at 65° C.

Upon completion of the feeds, the reactor contents were cooled to 40° C. and adjusted to a pH of 4.5 with a 15% solution of Sodium carbonate. The emulsion so formed was 53.7 weight % polymer solids and exhibited a viscosity (Brookfield LVT, #3 spindle at 12 rpm) of 2000 centipoise. The glass transition temperature of the copolymer was calculated to be $-20°$ C. The Tg values reported herein were calculated based on copolymer composition as a weighted average (by weight fraction) of the reported Tg values for homopolymers of each of the respective comonomers of the copolymer.

A surfactant (0.77 g) ethoxylated nonyl phenol (Triton X-165, Union Carbide)), a water soluble iron salt (1.92 g of 50 wt % ferric nitrate 9-hydrate) and a neutralizing base (1.61g of aqueous solution of 30 wt % sodium formate) were each added to 100 g of the above described emulsion to provide an adhesive composition.

EXAMPLES 2 TO 6 AND C1 TO C4

Examples 2 to 6 and C2 to C4 were made in the same manner as Example 1, except that a respective one of several neutralizing bases was substituted for the sodium formate used as the neutralizing base in Example 1:

1.93 g of 50 wt % aqueous sodium acetate trihydrate was used as the neutralizing base in Example 2;

3.34 g of 25 wt % aqueous sodium benzoate was used as the neutralizing base in the composition of Example 3;

6.28 g of 25 wt % aqueous potassium alpha-phenyl n-butyrate was used as the neutralizing base in the composition of Example 4;

4.58 g of 30 wt % aqueous potassium phenyl acetate was used as the neutralizing base in the composition of Example 5;

4.77 g of 30 wt % aqueous potassium 2-ethyl hexanoate was used as the neutralizing base in the composition of Example 6;

·no iron salt or neutralizing base was added to the polymer mixture in the composition of Example C1;

4.62 g of 30 wt % aqueous potassium salicylate was used as the neutralizing base in the composition of Example C2;

2.33 g of 30 wt % aqueous trisodium citrate dihydrate was used as the neutralizing base in the composition of Example C3; and 1.33 g of 60 wt % aqueous sodium lactate was used as the neutralizing base in the composition of Example C4.

EXAMPLE 7

The T-peel creep resistance of the adhesive composition of Example 1 was evaluated. Two coats of the composition was applied to cotton poplin cloth (mercerized, style 407) using a No. 10 wire wound applicator to apply the first coat and then, after a one minute delay, using a No. 40 wire wound applicator to apply the second coat. The cloth was folded in half on itself one minute after application of the second coat of the composition of Example 1 to form a cloth/adhesive laminate. The laminate was rolled once with a 5 pound roller and then allowed to dry overnight. A one inch wide strip was cut from the dried laminate and the edges of the cloth layers of the laminate were separated to provide a pair of opposed one inch long tabs at one end of the strip. The adhesive line between the tabs was marked as the starting point. A 500 g weight was secured to one of the tabs and the laminate/weight assembly was suspended by the other tab in a 170° F. oven. The distance tinpeeled was periodically measured and the distances measured were plotted versus time. The plot defined a straight line. The creep rate was determined by linear regression analysis of the line.

The above-described T-peel creep test was repeated for each of the adhesive compositions of Examples 2 to 6 and C1 to C4.

Results of the T-peel creep testing (inches unpeeled per minute (in/min)) are provided below in Table 1 for each of Examples 1 to 6 and C1 to C4. The counter ion used in each Example is also set forth in Table 1.

TABLE 1

| Example No. | Counter Ion | T-Peel Creep (in/min) |
|---|---|---|
| 1 | formate | 0.002 |
| 2 | acetate | 0.003 |
| 3 | benzoate | 0.002 |
| 4 | phenyl butyrate | 0.016 |
| 5 | phenyl acetate | 0.007 |
| 6 | 2-ethyl hexanoate | 0.036 |
| C1 | — | 0.3 |
| C2 | salicylate | 0.3 |
| C3 | lactate | 0.3 |
| C4 | citrate | 0.3 |

The adhesive compositions of Examples 1–6 each exhibited markedly lower creep than the compositions of Comparative Examples C1–C4.

Several laminated strips were made using the adhesive composition of Example 6, to demonstrate the use of a volatile counterion, that is, 2-ethyl hexanoate. Each of the strips was dried under a different respective set of conditions and then subjected to T-peel creep testing. Results of the testing, expressed as inches unpeeled per minute (in/min) are provided in Table 2 for each of the different drying conditions.

TABLE 2

| Example No. | Drying Conditions | T-Peel Creep (in/min) |
|---|---|---|
| 6 | 24 hours at 75° F. | 0.036 |
| 6 | 24 hours at 75° F., then 50 minutes at 170° F. | 0.0013 |
| 6 | 29 days at 72° F. | 0.002 |

The creep results for the composition of Example 6 gradually improve as the volatile counterion is driven off by prolonged drying at room temperature and or baking at an elevated temperature.

EXAMPLE C5

An emulsion polymer having the composition 22.5 wt % vinyl acetate/75 wt % butyl acrylate/2.5 wt % acrylic acid was made by the method of Example 1. The emulsion included 3 wt % Vinol 205 and 1.5 wt % Triton X-100. The emulsion polymer of Example C5 had a polymer solids content of 53.5 weight % and exhibited a pH of 5. The Tg of the polymer of Example C5 was calculated to be about −20° C.

EXAMPLE C6

A composition including one equivalent of a polyvalent zinc crosslinker was made by adding 5.1 g of a zinc ammonium carbonate solution (12.05 wt % active Zn) to 100 g of the composition of Example C5. The composition of Example C6 exhibited a pH of 9.

EXAMPLE C7

A composition including one equivalent of an alternative polyvalent zinc crosslinker was made by adding 8.15 g of 25% zinc acetate dihydrate to 100g of the emulsion polymer of Example C5. The composition of Example C7 exhibited a pH of 5.

EXAMPLE 8

A composition including one equivalent of a polyvalent iron crosslinker was made by adding 4.82 g of 50% ferric nitrate 9-hydrated and 4.82 g of 50% sodium acetate trihydrate to 100g of the emulsion polymer of Example C5. The composition of Example 8 Exhibited a pH of 5.

EXAMPLE 9

The T-peel creep resistance of each of the compositions of Examples C5 to C7 and Example 8 was tested according to the method set forth above in Example 7.

Results of the T-peel creep testing (inches unpeeled per minute (in/min)) are provided below in Table 3 for each of the compositions of Examples C5–C7 and Example 8. The metal compound used as the crosslinker in each of those compositions and the pH of each of the compositions are also set forth in Table 3.

TABLE 3

| Example No. | Crosslinker | pH | T-Peel Creep (in/min) |
|---|---|---|---|
| C5 | none | 5 | 0.3 |
| C6 | zinc ammonium carbonate | 9 | <0.0003 |
| C7 | zinc acetate | 5 | 0.07 |
| 8 | Iron (III) acetate | 5 | <0.0003 |

The adhesive composition of Example 8 exhibited markedly lower creep than the compositions of Comparative Examples C5 and C7 at a pH of 5 and exhibited performance comparable to that exhibited by Comparative Example C6 at a pH of 9.

EXAMPLES 10 TO 15 AND C8 TO C11

A group of adhesive compositions, Examples 10 to 15 and C8 to C11, was made. The base polymers used in Examples 10 to 15 and C8 to C11 were made according to the emulsion polymerization process set forth above in Example 1, except that Examples C8 –C10 and 10–11 were made using 0.04% $H_2O_2$ as the polymerization initiator, while Examples C11 and 12–15 were made using 0.067% $H_2O_2$ as the initiator. Each of the base polymers included 3.0 wt % vinyl alcohol (Vinol 205) and 1.5 wt % surfactant (Triton X-100, Union Carbide).

Different relative amounts of ferric nitrate and sodium acetate were added to the base polymers to form the respective adhesive compositions of Examples 10 to 15. Ferric nitrate and sodium acetate were not added to the base polymers of the adhesive compositions of Examples C8 to C11. The polymer composition of each of the respective base polymers, given as wt % vinyl acetate/wt % butyl acrylate/wt % acrylic acid (VA/BA/AA), and the relative amounts of ferric nitrate and sodium acetate added, given as equivalents Iron(III) based on the acrylic acid content of the respective polymer (equivalents), is set forth below in Table 4 for each of Examples 10 to 15 and C8 to C11.

TABLE 4

| Example No. | VA/BA/AA (wt %) | ferric nitrate (equivalents) | sodium acetate (equivalents) |
|---|---|---|---|
| C8 | 25/74/1 | 0 | 0 |
| 10 | 25/74/1 | 0.5 | 0.5 |
| C9 | 23/75/2 | 0 | 0 |
| 11 | 23/75/2 | 0.5 | 0.5 |
| C10 | 22.5/75/2.5 | 0 | 0 |
| 12 | 22.5/75/2.5 | 0.5 | 0.5 |
| C11 | 24/73/3 | 0 | 0 |
| 13 | 24/73/3 | 0.33 | 0.33 |
| 14 | 24/73/3 | 0.67 | 0.67 |
| 15 | 24/73/3 | 1 | 1 |

The T-peel creep of each of the adhesive compositions of Examples 10 to 15 and C8 to C11 was measured according to the method set forth above in Example 7. Results of the testing are provided in Table 5 as inches unpeeled per minute (in/min).

TABLE 5

| Example No. | T-Peel Creep (in/min) |
|---|---|
| C8 | 0.3 |
| 10 | 0.05 |
| C9 | 0.3 |
| 11 | 0.003 |
| C10 | 0.3 |
| 12 | 0.0004 |
| C11 | 0.3 |
| 13 | 0.005 |
| 14 | 0.0013 |
| 15 | 0.0003 |

The adhesive compositions of Examples 10–15 each exhibited markedly lower creep than the compositions of Comparative Examples C8–C11.

EXAMPLES 16–24 AND C12

An emulsion of a base polymer (50 g of a 55 wt % aqueous emulsion of 98 wt % butyl acrylate/2 wt % methacrylic acid) and an ethoxylated octyl phenol surfactant (1.26 g of a 70 wt % solution of Triton X-165, Union Carbide) were combined to provide a polymer emulsion having a pH of 1.6.

The compositions of Examples 16 to 24 were each made by adding a source of Iron (III) ions (0.86 g ferric nitrate 9-hydrate) to a respective 50 g sample of the polymer emulsion and by adjusting the pH of the respective samples by adding sodium acetate trihydrate or ammonia or sodium acetate trihydrate and ammonia. In those Examples in which both sodium acetate trihydrate and ammonia were used, the ammonia was added to the emulsion prior to addition of the ferric nitrate 9-hydrate and the sodium acetate trihydrate.

The composition of Example C12 was made by adding ammonia to a 50 g sample of the polymer emulsion to adjust the pH of the emulsion to 9.7.

Table 6 sets forth the amount of sodium acetate trihydrate (as grams of a 50 wt % aqueous solution of sodium acetate trihydrate), the amount of ammonia (as grams of a 28 wt % aqueous solution of ammonia) and the pH for each of Examples 15 to 23 and C12.

TABLE 6

| Example No. | 28% Ammonia (g) | 50% Sodium Acetate (g) | pH |
| --- | --- | --- | --- |
| 16 | 0 | 0 | 1.6 |
| 17 | 0 | 0.43 | 2.25 |
| 18 | 0 | 0.64 | 3.0 |
| 19 | 0 | 0.86 | 4.25 |
| 20 | 0 | 1.72 | 4.9 |
| 21 | 0.40 | 1.72 | 5.45 |
| 22 | 0.58 | 1.72 | 5.9 |
| 23 | 1.04 | 1.72 | 7.1 |
| 24 | 1.75 | 0 | 8.5 |
| C12 | 2.2 | 0 | 9.7 |

EXAMPLE 25

The T-peel creep resistance of each of the emulsions of Examples 16 to 24 and C12 was evaluated at 72° F. according to the method set forth above in Example 7.

The adhesive compositions of Examples 16–24 and C12 were applied to a 2 mil thick poly(ethyleneterephthalate) (Mylar, E.I. du Pont de Nemours) film and dried for 5 minutes at 150° F. to give a dry adhesive film having a thickness of about 0.001 inch. The finger tack of each of the respective dried films was tested by touching the index finger to a dry film of the adhesive and rating the perceived tackiness of the film on a scale of 0 to 5, wherein 5 indicates highest tack.

The results of the T-peel testing (expressed as inches unpeeled per minute (in/min)) and the finger tack testing (expressed as a rating of 0 to 5) are reported below in Table 7.

TABLE 7

| Example No. | T-Peel Creep (in/min) | Finger Tack |
| --- | --- | --- |
| 16 | 0.063 | 3.5 |
| 17 | 0.056 | 2 |
| 18 | 0.047 | 1 |
| 19 | 0.047 | 1 |
| 20 | 0.030 | 1 |
| 21 | 0.038 | 1 |
| 22 | 0.080 | 2 |
| 23 | 0.122 | 3 |
| 24 | 0.121 | 4.5 |
| C12 | 0.189 | 5 |

The compositions of Examples 16–24 each exhibited lower creep and lower finger tack than the composition of Example C12.

EXAMPLE 26

A surfactant (18.8 g of a block copolymer of polyethylene oxide and polypropylene oxide (Pluronic F-87, BASF)) was dissolved in 1184.54 g water. Sodium benzoate (127.9 g of a 25 wt % aqueous solution) was added to the surfactant solution and then ferric chloride (40 g of a 30 wt % aqueous solution) was added to the solution with stirring. Ferric benzoate particles of a generally spherical shape and about 0.5 to 1.0 microns in size were formed. The particles were concentrated through centrifugation and then redispersed in a small amount of water to form a slurry of about 39% solids content.

EXAMPLE 27

Ferric benzoate particles were made by the method set forth above in Example 26, except that 156 g of a 20% aqueous solution of vinyl alcohol (Vinol 205) was substituted for the polyethylene oxide/polypropylene oxide copolymer. The particles so formed were spherical and about 0.1 to about 0.3 microns in diameter.

EXAMPLE 28

Ferric benzoate particles were made by the method set forth above in Example 26, except that 9.38 g of the polyethylene oxide/polypropylene oxide copolymer and 78.1 g of a 20% aqueous solution of vinyl alcohol (Vinol 205) were used. The particles so formed were needle-shaped and about 0.5 microns by about 1.5 microns in size.

EXAMPLE 29

Ferric benzoate-acetate particles were made by the method set forth above in Example 26, except that 115.1 g of 25 wt % sodium benzoate and 6.03 g of 50 wt % sodium acetate trihydrate was substituted for the 127.9 g of 25 wt % sodium benzoate used in Example 26. The particles so formed were needle-shaped and about 0.8 microns by 3 microns in size.

EXAMPLE C13

The adhesive composition of Example C13 consisted of an emulsion of a base polymer (76 wt % butyl acrylate, 19 wt % styrene, 3.5 wt % acrylic acid, and 1.5 wt % itaconic acid). The emulsion had a polymer solids content of 44% and a pH of 6.7. The Tg of the base polymer of Example C13 was calculated to be about −16° C.

EXAMPLE 30

An adhesive composition of the present invention was made by adding colloidal ferric benzoate made by the method set forth above in Example 26 (2.85 g of a 39 wt % aqueous slurry) and a surfactant (0.79 g ethoxylated octyl phenol (Triton X-165, Union Carbide)) to 50 g of the emulsion of Example C13. The composition exhibited a pH of 5.8.

EXAMPLE 31

A surfactant (0.79 g ethoxylated octyl phenol (Triton X-165, Union Carbide)), ammonium hydroxide (0.7 g of a 28% aqueous solution) and colloidal ferric benzoate made by the method set forth above in Example 26 (2.85 g of a 39 wt % aqueous slurry), were added to 50 g of the neat emulsion polymer of Example C13 to give an adhesive composition having a pH of 7.4.

EXAMPLE 32

The T-Peel Creep properties of each of the adhesive compositions of Examples C13, 30 and 31 were measured according to the method set forth above in Example 7. Results of the T-Peel Creep testing are provided below in Table 8 as inches unpeeled per minute (in/min).

TABLE 8

| Example No. | T-Peel Creep (in/min) |
|---|---|
| C13 | 0.8 |
| 30 | 0.056 |
| 31 | 0.06 |

The adhesive compositions of Examples 30 and 31 each exhibited markedly lower creep than the composition of Comparative Example C13.

EXAMPLE 33–36 AND C14–C18

A source of Iron (III) ions (aqueous 50% ferric nitrate 9-hydrate) is added to respective 100g samples of the polymer emulsion of Example 1 (22.5 wt % vinyl acetate/75 wt % butyl acrylate/2 wt % acrylic acid) to form the crosslinkable emulsions of Examples 33–36.

A source of Iron (III) ions (aqueous 50% ferric nitrate 9-hydrate) are added to respective 100g samples of an emulsion of a base polymer that is made by the method of Example 1 but lacks comonomeric units derived front a carboxylic acid monomer (25 wt % vinyl acetate/75 wt % butyl acrylate) to form the noncrosslinkable emulsions of Examples C14–C18.

The Iron content (expressed as the amount of 50% ferric nitrate 9-hydrate added per 100 g emulsion (g FeNO$_3$/100g)) of the compositions of Examples 33–36 and C14–C18 is set forth below in Table 9.

EXAMPLE 37

The water resistance of the compositions of Examples 33–36 and C14–C17 is measured.

Test strips are made by the method set forth above in Example 7 except that only the last inch of each of the strips is coated with adhesive. A one inch lap joint is made between two strips and allowed to dry overnight at ambient conditions.

The laminated strips are hung in water with a 500 g weight attached to the bottom end of the lower strip. The time to failure of the joint is measured. The water resistance of each of the joints is set forth below in Table 9 as time to failure (hours).

TABLE 9

| Example No. | Iron Content (g FeNO$_3$/100 g) | Time to Joint Failure (hours) |
|---|---|---|
| 33 | 0 | 1 |
| 34 | 0.38 | 5 |
| 35 | 0.96 | >144 |
| 36 | 1.92 | >144 |
| C14 | 0 | 1 |
| C15 | 0.38 | 6 |
| C17 | 0.96 | >144 |
| C18 | 1.92 | >144 |

EXAMPLE C19

A base polymer (50 g of a 55 wt % aqueous emulsion of 98 wt % butyl acrylate/2 wt % acrylic acid), an ethoxylated octyl phenol surfactant (0.98 g Triton X-405, Union Carbide) and a hydrocarbon tackifier (15 g Piccotex LC55WK, Hercules) were combined to make a pressure sensitive adhesive composition. The Tg of the base polymer was calculated to be about −48° C.

EXAMPLE 38

A pressure sensitive adhesive composition of the present invention was modified was made by adding an iron salt (0.86 g of a 50 wt % aqueous solution of ferric nitrate 9-hydrate) and a counter ion (0.86 g of a 50 wt % aqueous solution of sodium acetate trihydrate) to 65.98 g of the composition of Example C19.

EXAMPLE 39

The adhesive of Example C19 was applied to a 2 mil thick poly(ethyleneterephthalate) (Mylar, E.I. du Pont de Nemours) film and dried for 5 minutes at 150° F. to give a dry adhesive film having a thickness of about 0.001 inch. The coated side of the film was applied to untreated oriented polypropylene sheet (0.001 inch thick). The assembly so formed was held overnight at 78° F. and 50 % relative humidity and then cut into 1 inch wide strips, each about 12 inches in length, for testing.

The peel strength of the adhesive was measured by Pressure Sensitive Tape Council Method 1. The polypropylene layer was removed from the strip and the adhesive side of the strip was applied to a clean stainless steel panel (2 inches by 6 inches by 0.05 inch). The strip was then rolled with a 4.5 pound roller, without applying hand pressure, and allowed to dwell for 20 minutes. The strip was then peeled off of the panel at a peel rate of 12 inches per minute using a tensile tester.

The shear strength of the adhesive was measured by Pressure Sensitive Tape Council Method 7. One end of an adhesive strip made according to the method set forth above in the description of Pressure Sensitive Tape Council Method 1 was applied to a stainless steel panel so that the strip contacted a 0.5 inch by 1 inch portion of one edge of the panel. The strip was trimmed so that only a 2 inch portion over hung the edge of the panel. The panel was hung in a position 2 degrees from vertical with a 1 kilogram weight suspended from the overhanging portion of adhesive strip. The time required for the strip to slip off the panel was measured.

Tack was measured using a Polyken tack tester using adhesive strips of the type described above.

The tests were repeated using the pressure sensitive adhesive of Example 38. Results of the testing are provided below in Table 6 as Tack (grams), Peel (ounces per inch of width) and shear (hours) for Example C13 and Example 38. The failure mode of the peel test is also noted in Table 10 for each of the Examples.

TABLE 10

| Example No. | Tack (grams) | Peel (ounces) | Shear (hours) |
|---|---|---|---|
| C19 | 1040 | 54 (adhesive failure) | 5.7 |
| 38 | 760 | 33 (adhesive failure) | 148 |

EXAMPLE C20

A base polymer (180.28 g of a 55% aqueous emulsion of 74 wt % butyl acrylate/23 wt % ethyl acrylate/1 wt % styrene/2 wt % acrylic acid), a surfactant (3.98 g Triton X-165), a hydrocarbon tackdrier (18.03 g Piccotex LC55WK, Hercules) and a nonionic urethane thickener (0.5 g Acrysol RM 825, Rohm and Haas) were combined to make an adhesive composition.

EXAMPLE 40

An adhesive composition of the present invention was made by adding an iron salt (1.05 g of a 30 wt % aqueous solution of ferric chloride) and a counter ion (3.35 g of a 25 wt % aqueous solution of sodium benzoate) to the composition of Example C20.

EXAMPLE 41

The adhesive composition of Example C20 was coated on 4 mil thick masking tape crepe paper and dried at 150° F. for 10 minutes to provide a masking tape having a 0.003 inch dry adhesive film thickness. A one inch wide strip of the masking tape was applied to a steel panel and the assembly was placed in an oven at 150° C. for 45 minutes. The tape was removed from the panel while still in the oven. The adhesive layer of the tape failed cohesively, leaving portions of the layer on the steel panel.

The test procedure was repeated using the adhesive formulation of Example 40. The adhesive layer made from the adhesive composition of Example 40 failed adhesively, allowing the tape to be cleanly removed from the steel test panel.

EXAMPLE 42

A base polymer (50 g of a 55% aqueous solution of 74 wt % butyl acrylate/23 wt % ethyl acrylate/1 wt % styrene/2 wt % methacrylic acid), a surfactant (1.13 g Triton X- 165), a hydrocarbon tackifier (7.5 g Piccotex LC 55, Hercules), an octadecyl sulfosuccinamate surfactant (1.57 g Aerosol 18, American Cyanamid), an iron salt (0.57 g of a 50 wt % aqueous solution of ferric nitrate 9-hydrate) and a counter ion (1.14 g of a 25 wt % aqueous solution of sodium benzoate) were combined to make an adhesive composition. The Tg of the base polymer was calculated to be about −39° C.

Labels were made by coating the adhesive composition on 50 pound electronic data processing (EDP) paper and drying the coated paper at 150° F. to give a label having a dry adhesive film thickness of 0.0015 inch. Labels were applied to each of several respective substrates, that is, decorative poly(vinyl chloride) (PVC), low density poly(ethylene) film (LDPE), coated cardboard stock, cardboard, stainless steel and glass. Assemblies were held at room temperature for 20 minutes, at 40° C. for 20 hours and then at 40° C. for 3 days. The samples were then equilibrated at 78° F. and 50 % relative humidity for a few hours before peel testing. The labeled assemblies were subjected to peel testing by Pressure Sensitive Tape Council Method 1 (summarized above in Example 23) at a peel rate 12 inches per minute.

Results of the peel testing are set forth below in Table 11 as peel (ounces per inch of width). All samples failed adhesively, allowing the labels to be cleanly removed from each of the respective substrates.

TABLE 11

| Substrate | Peel, 20 min @ R.T. | Peel, 20 hr @ 40 C. | Peel, 3 days @ 40 C. |
|---|---|---|---|
| PVC | 53 | 64 | 60 |
| LDPE | 28 | 24 | 28 |
| Coated Cardboard Stock | 60 | 61 | 64 |
| Cardboard | 7 | 10 | 16 |
| Stainless Steel | 26 | 40 | 52 |
| Glass | 18 | 44 | 56 |

EXAMPLE C21

A base polymer ( 50 g of a 50 wt % aqueous emulsion of 19.5 wt % acrylonitrile/2.4 wt % methyl methacrylate/3.5 wt % methacrylic acid/29.6 wt % styrene/45 wt % ethyl hexyl acrylate) and a solvent (3.75 g Texanol, Eastman Kodak) were combined to make a varnish composition. The polymer emulsion had a pH of 6.5 and the Tg of the base polymer was calculated to be about 35° C.

EXAMPLE 43

A varnish composition of the present invention was made by adding an iron salt (1.35 g of a 50 wt % aqueous solution of ferric nitrate 9-hydrate), a counter ion (2 g of a 30 wt % aqueous solution of potassium 2-ethyl hexanoate) and a surfactant (4.2 g of a 30 wt % aqueous solution of a block copolymer of polyethylene oxide and polypropylene oxide (Pluronic F 87, BASF) to 53.7 g of the composition of Example C21. The composition of Example 42 exhibited a pH of 6.

EXAMPLE 44

A layer of the varnish composition of Example C21 was drawn down on 0.025 inch thick aluminum panels using a 0.003 inch Bird applicator and allowed to dry at room temperature for one week. The coating layer was tested for solvent resistance by rubbing a coated panel with xylene-saturated cheese cloth using hand pressure and recording the number of passes until bare aluminum was just exposed. Knopp hardness of the coating layer was tested using a Tukon hardness tester. The impact resistance of the coating layer was tested by reverse impact using a dropping weight impact tester. The maximum impact measurable using the instrument was 56 foot-pounds and corresponded to a very impact resistant varnish. The solvent resistance, hardness and impact tests were repeated using panels coated with the composition of Example 43.

Results of the testing are set forth below in Table 12 as # of Xylene rubs, Knopp Hardness and Impact Strength (foot-pounds) for the coatings of Example C21 and Example 43.

TABLE 12

| Example No. | # Xylene rubs | Knopp Hardness # | Impact Strength (foot-pounds) |
|---|---|---|---|
| C21 | 50 | 0.71 | >56 |
| 43 | 135 | 0.96 | >56 |

The composition of Example 43 exhibited higher solvent resistance and hardness than the composition of Comparative Example C21.

The crosslinkable emulsion of the present invention can be ionically crosslinked over a wide range of pH to provide polymeric films for a variety of end uses.

We claim:

1. A crosslinkable polymeric emulsion comprising particles of a copolymer derived from an ethylenically unsaturated carboxylic acid monomer and an ethylenically unsaturated comonomer dispersed in an aqueous medium; colloidal particles of an insoluble ferric salt dispersed in the aqueous medium; and an amount of a stabilizer selected from the group consisting of nonionic surfactants and protective colloids effective to sterically stabilize the emulsion; said emulsion having a pH of from about 1.5 to about 8.5.

2. The emulsion of claim 1, wherein the copolymer comprises from about 1 wt % to about 7 wt % monomeric units derived from the ethylenically unsaturated carboxylic acid monomer and from about 93 weight percent to about 99 weight percent monomeric units derived from the ethylenically unsaturated comonomer.

3. The emulsion of claim 1, wherein the copolymer comprises front about 3 wt % to about 5 wt % monomeric units derived from the ethylenically unsaturated carboxylic acid monomer and from about 95 weight percent to about 97 weight percent monomeric units derived front the ethylenically unsaturated comonomer.

4. The emulsion of claim 1, wherein the ethylenically unsaturated carboxylic monomer is selected from the group consisting of acrylic acid, methacrylic acid, crotonoic acid, itaconic acid, aconitic acid, atropic acid, maleic acid, fumaric acid, vinyl acetic acid, vinyl benzoic acid and mixtures thereof.

5. The emulsion of claim 1, wherein ethylenically unsaturated comonomer is selected from the group consisting of monoethylenically unsaturated monomers and mixtures thereof.

6. The emulsion of claim 5, wherein the ethylenically unsaturated comonomer is selected from the group consisting of methyl methacrylate, butyl acrylate, ethyl acrylate, ethyl hexyl acrylate styrene, vinyl acetate, acrylonitrile and mixtures thereof.

7. The emulsion of claim 1, wherein the emulsion includes from about 30 weight percent to about 65 weight percent of the particles of the copolymer.

8. The emulsion of claim 1, wherein the insoluble salt is selected from the group consisting of ferric benzoate, ferric hexanoate, ferric 2-ethyl hexanoate, ferric octanoate, ferric naphthenoate, ferric oleate and mixtures thereof.

9. The emulsion of claim 1, wherein at least a portion of the insoluble ferric salt is dispersed in the aqueous phase of the emulsion.

10. The emulsion of claim 1, wherein at least a portion of the iron salt is dispersed within the particles of the copolymer.

11. The emulsion of claim 1, wherein the copolymer includes repeating units derived from the carboxylic acid monomer, each of said repeating units comprising a carboxyl substituent group and wherein the emulsion includes about 0.05 to about 1.5 equivalents Iron (III) ions per carboxyl substituent group of the copolymer.

12. The emulsion of claim 11, wherein the emulsion includes about 0.1 to about 1.0 equivalents Iron (III) ions per carboxyl substituent group of the copolymer.

13. The emulsion of claim 1, wherein the pH of the emulsion is from about 2 to about 7.

14. The emulsion of claim 1, wherein the pH of the emulsion is from about 3 to about 5.5.

15. The emulsion of claim 1, wherein the stabilizer is a nonionic surfactant selected from the group consisting of ethoxylated alkyl phenols, ethoxylated alcohols, ethoxylated mercaptans, ethoxylated fatty acids, ethoxylated amines, ethoxylated fatty esters, ethoxylated oils, ethoxylated sorbitan derivatives, ethoxylated sucrose esters, poly(ethylene oxide-propylene oxide) block copolymers and mixtures thereof and having a hydrophilic/lipophilic balance of greater than about 10.

16. The emulsion of claim 1, wherein the stabilizer is a protective colloid selected from the group consisting of fully hydrolyzed poly(vinyl alcohol), partially hydrolyzed poly(vinyl alcohol), poly(vinyl pyrollidone), hydroxyethyl cellulose and mixtures thereof.

17. The emulsion of claim 1, wherein the emulsion includes from about 0.5 parts by weight to about 5 parts by weight of the stabilizer per 100 parts by weight of the particles of the copolymer.

18. The emulsion of claim 1, wherein the emulsion consists essentially of the particles of copolymer, the colloidal particles of insoluble ferric salt and the stabilizer.

* * * * *